(12) United States Patent
Lee et al.

(10) Patent No.: US 8,098,384 B1
(45) Date of Patent: Jan. 17, 2012

(54) COPLANARITY-TESTING MACHINE

(75) Inventors: Feng-chi Lee, Tu Cheng (TW);
Chi-hsing Chang, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 45 days.

(21) Appl. No.: 12/848,898

(22) Filed: Aug. 2, 2010

(51) Int. Cl.
*G01B 11/14* (2006.01)

(52) U.S. Cl. .................................................... 356/614

(58) Field of Classification Search .................. None
See application file for complete search history.

(56) References Cited

U.S. PATENT DOCUMENTS

| | | | |
|---|---|---|---|
| 4,810,941 A * | 3/1989 | Ohishi et al. | 388/815 |
| 5,428,280 A * | 6/1995 | Schmidt et al. | 318/568.11 |
| 6,911,837 B2 * | 6/2005 | Ishikawa et al. | 324/750.22 |

* cited by examiner

*Primary Examiner* — Tu Nguyen
(74) *Attorney, Agent, or Firm* — Cheng-Ju Chiang

(57) ABSTRACT

Provided is a coplanarity-testing machine. The coplanarity-testing machine includes a working stage, an illuminant, an image picking-up processor, a frequency converter, a double-cross lines generator, a linear module and a display. The linear module includes a test vehicle, a linear drive mechanism and a regulating block. The linear drive mechanism can drive the test vehicle to linearly move to and fro on a bearing surface of the working stage. The regulating block is placed on a supporting surface of the test vehicle. By adjusting the double-cross lines generator, horizontal lines of the generator can coincide with a projecting line of the bottom surface of the regulating block, and vertical lines of the generator can measure the height of the regulating block. The coplanarity-testing machine can timely and exactly display the testing result, is easily operated, and has a high testing efficiency and a high exact degree of testing.

5 Claims, 5 Drawing Sheets

US 8,098,384 B1

COPLANARITY-TESTING MACHINE

BACKGROUND OF THE INVENTION

1. Field of the Invention

The present invention relates to a testing device, and more particularly to a coplanarity-testing machine.

2. Description of the Prior Art

At recent years, production scale of connectors is becoming larger and larger with the development of electrical products. Each connector generally comprises an insulative housing and a plurality of contacts. The coplanarity of contacting surfaces or welded surfaces of the contacts can directly affect the quality of the connector. Therefore, it is needed to strictly test the coplanarity of the connector before leaving factory.

A traditional method for testing the coplanarity of contacting surfaces or welded surfaces of the contacts of the connector is mainly employing a microscope, by which user can observe the product one by one. But because the size of each connector is small and the quantity of the connectors is great, the loading of the prior testing work done by human check is very heavy and rather time-consuming. And this prior testing work is so subjective that the exact degree of testing cannot be ensured.

BRIEF SUMMARY OF THE INVENTION

An object of the present invention is to provide a coplanarity-testing machine, which can fast display the testing result for being observed, is easily operated, and has a high testing efficiency and a high exact degree of testing.

To achieve the above object, in accordance with the present invention, a coplanarity-testing machine is provided, comprising a working stage, an illuminant, an image picking-up processor, a frequency converter, a double-cross lines generator, a linear module and a display. The linear module includes a linear drive mechanism, a test vehicle and a regulating block. The working stage has a horizontal bearing surface. The test vehicle is slidably mounted on the bearing surface of the working stage. The linear drive mechanism is mounted on the bearing surface of the working stage for driving the test vehicle to linearly move to and fro on the bearing surface. The test vehicle has a horizontal supporting surface for carrying at least one test-waiting product. The regulating block, which is corresponding to the test-waiting product and has a horizontal top surface and a horizontal bottom surface, is placed on the supporting surface of the test vehicle. By adjusting the double-cross lines generator, horizontal lines generated by the double-cross lines generator can coincide with a projecting line of the bottom surface of the regulating block, and vertical lines generated by the double-cross lines generator can measure the height of the regulating block, and the height of the regulating block can be displayed on the display. The test-waiting product illuminated by illuminant can be imaged on the display by the image picking-up processor and the frequency converter.

Based on the above description, the coplanarity-testing machine as provided by the present invention can timely and exactly display the testing result of product on the display by the image picking-up processor cooperated with the light source. The coplanarity-testing machine is easy to be operated, and has a high testing efficiency and a high exact degree of testing.

DETAILED DESCRIPTION OF THE PREFERRED EMBODIMENTS

The following embodiment with reference to the accompanying drawings now has been given for detail describing the technology, the feature, the object and the effect of the present invention.

Figure 1A:
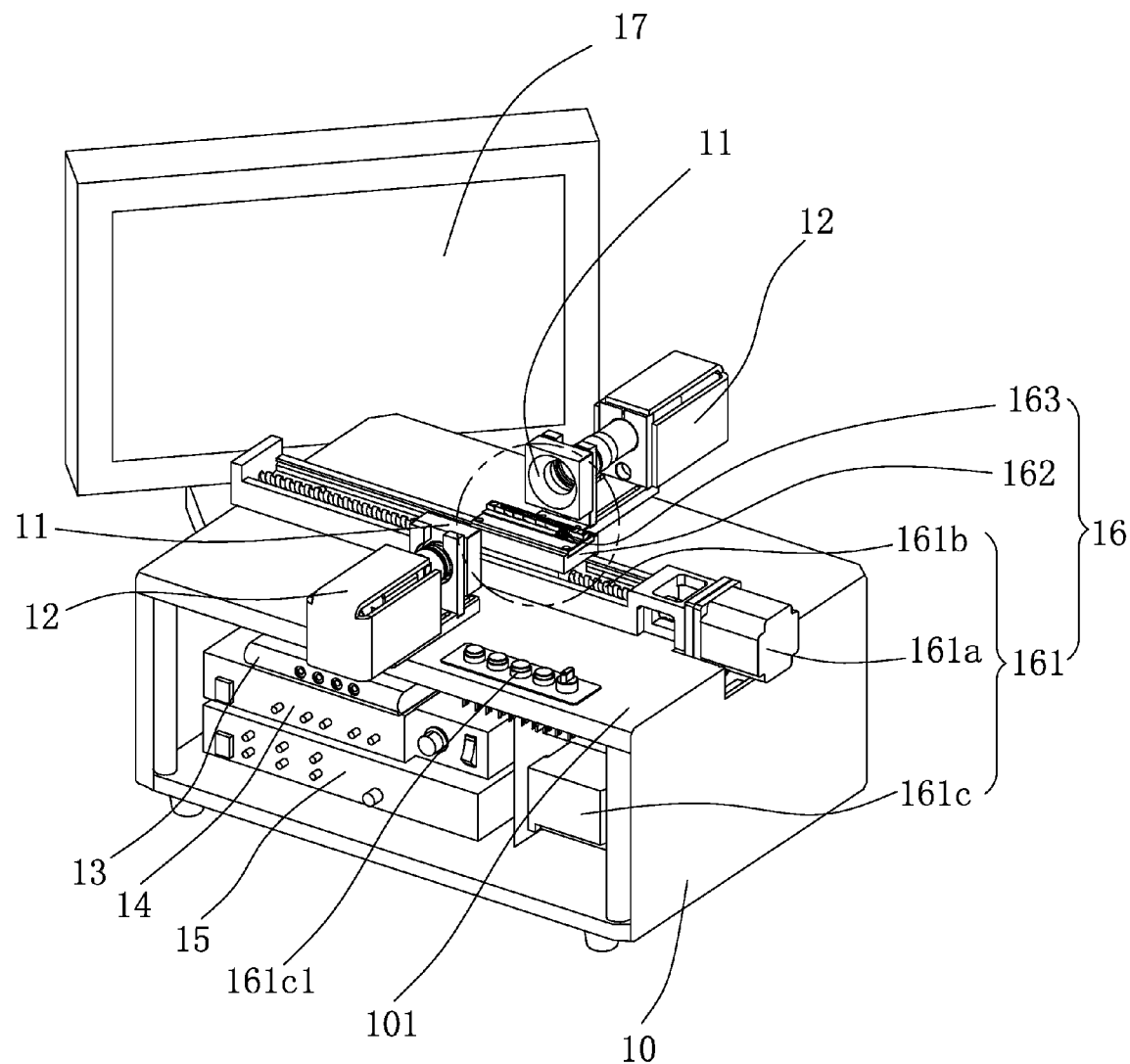
FIG. 1A is a schematic view of a coplanarity-testing machine according to one embodiment of the present invention.

Please refer to FIG. 1A, a coplanarity-testing machine at least comprises a working stage 10, an illuminant 11, an image picking-up processor 12, a frequency converter 13, a double-cross lines generator 14, an image separator 15, a linear module 16 and a display 17. The illuminant 11, the image picking-up processor 12, the frequency converter 13, the double-cross lines generator 14 and the image separator 15 are positioned on the working stage 10.

Figure 1B:
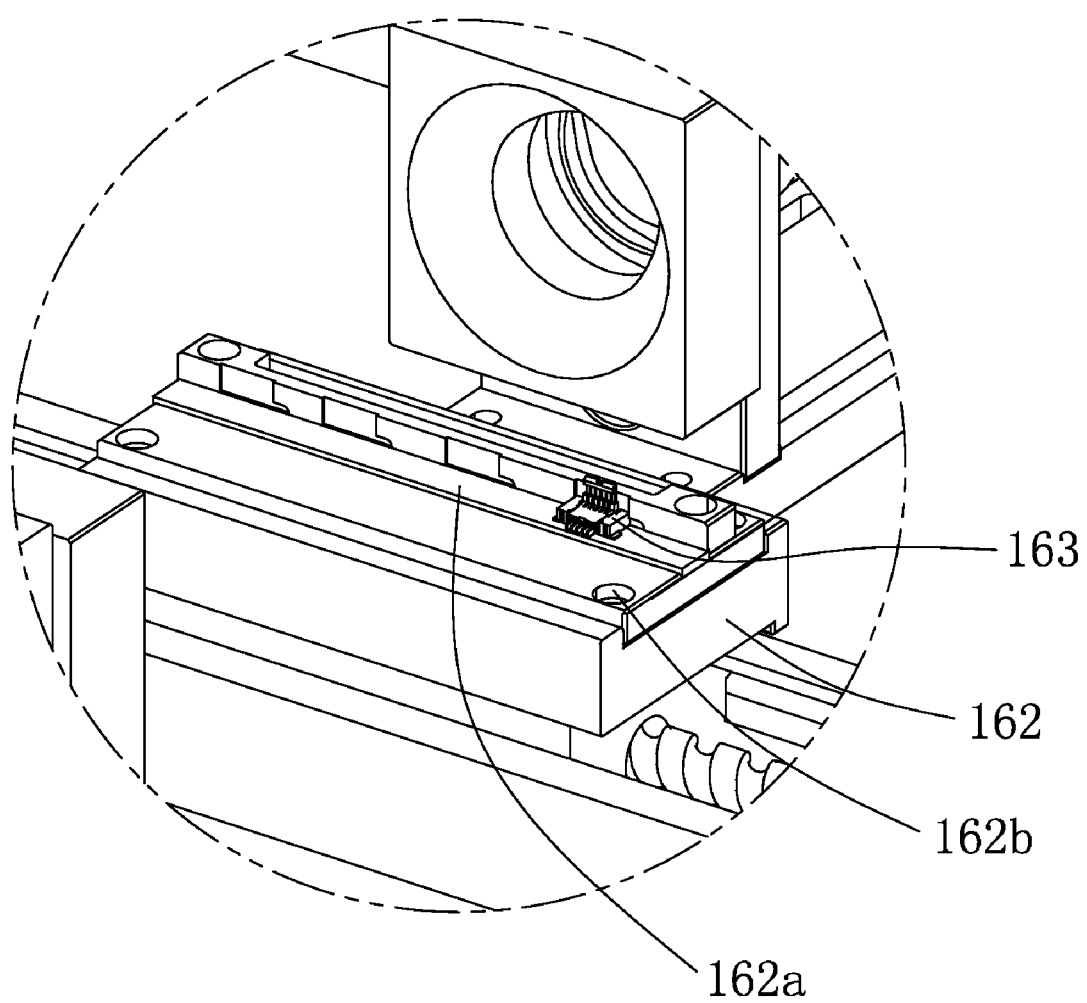
FIG. 1B is an enlarged view of part A in FIG. 1A.

Specifically, the linear module 16 includes a linear drive mechanism 161, a test vehicle 162 and a regulating block 163. As shown in FIG. 1A, the working stage 10 has a horizontal bearing surface 101, on which the test vehicle 162 is slidably mounted. The linear drive mechanism 161 is also mounted on the bearing surface 101 of the working stage 10 for driving the test vehicle 162 to linearly move to and fro on the bearing surface 101. As shown in FIGS. 1B and 2B, the test vehicle 162 has a horizontal supporting surface 162a for carrying at least one test-waiting product 18, which is a connector in this embodiment. Two screw holes 162b are formed on the test vehicle 162. The regulating block 163, which is corresponding to the test-waiting product 18 and top and bottom surfaces of which are horizontal, is placed on the supporting surface 162a of the test vehicle 162. Adjusting the double-cross lines generator 14 can make horizontal lines generated by the generator 14 coincide with a projecting line of the bottom surface of the regulating block 163, so that vertical lines generated by the generator 14 can measure the height of the regulating block 163 and the height of the regulating block 163 can be displayed on the display 17. Similarly, the test-waiting product 18 illuminated by illuminant 11 can be imaged on the display 17 by the image picking-up processor 12 and the frequency converter 13.

Figure 2A:
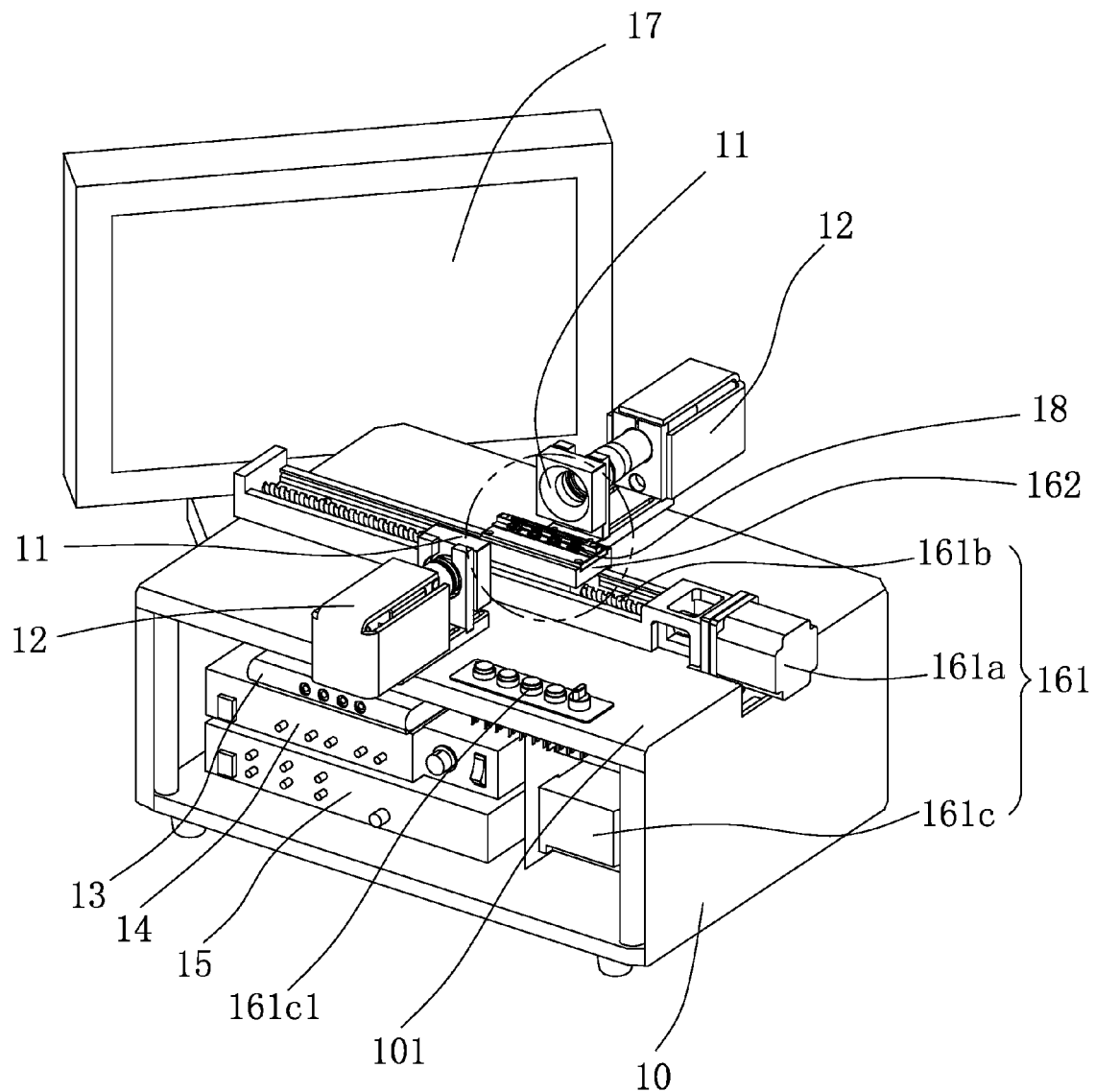
FIG. 2A is a schematic view of the coplanarity-testing machine when testing products.
Figure 2B:
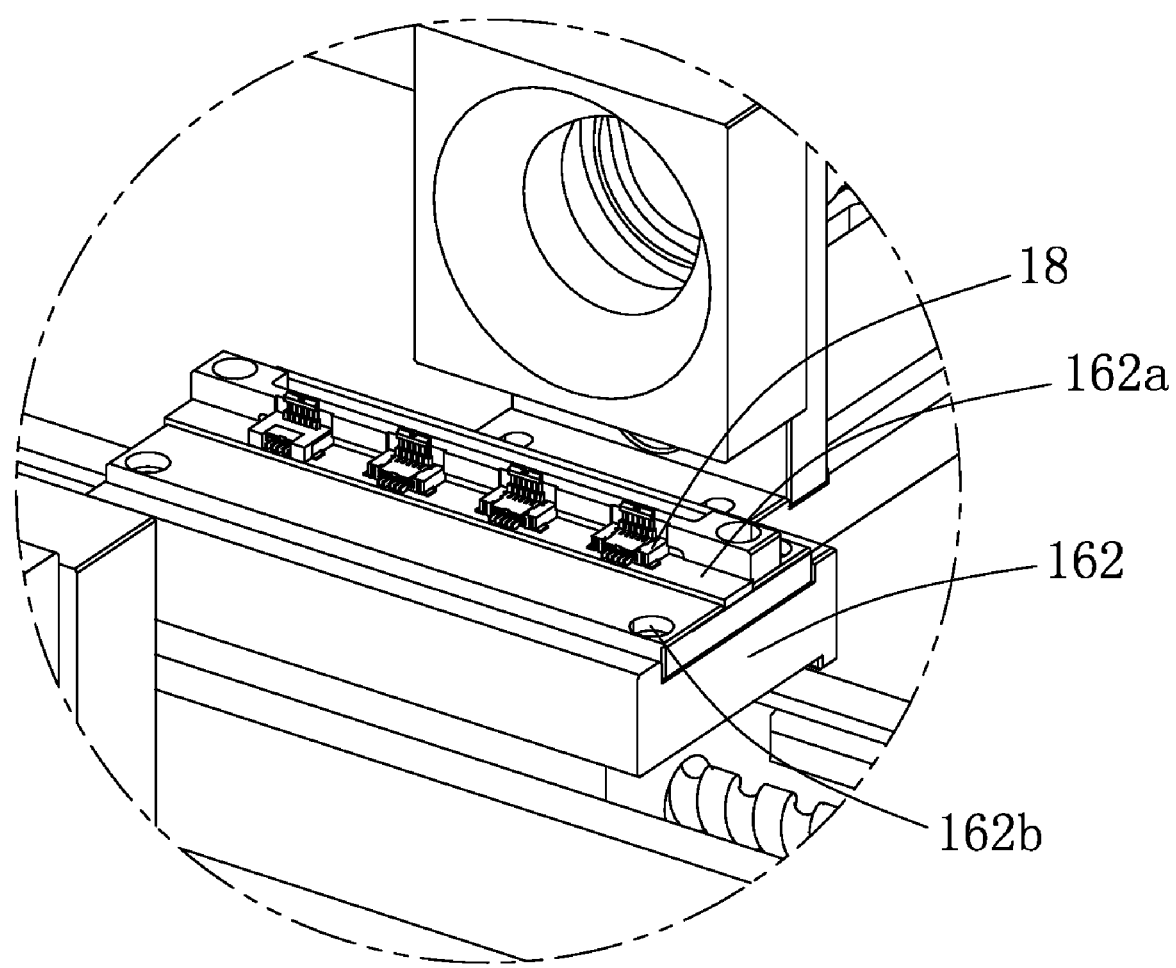
FIG. 2B is an enlarged view of part B in FIG. 2A.

In this embodiment shown in FIGS. 1A and 2A, the coplanarity-testing machine comprises two illuminants 11 and two image picking-up processors 12 separately corresponding to the two illuminants 11. The test-waiting product 18 or the regulating block 163 is positioned between the two image picking-up processors 12 for assuring the exact degree of testing. The illuminant 11 is an LED source. The linear drive mechanism 161 comprises a motor 161a, a threaded rod 161b and a controller 161c. The motor 161a is connected to the threaded rod 161b to drive it rotate. The screw thread of the threaded rod 161b can mesh with a screw hole formed on a bottom surface of the test vehicle 162 for driving the test vehicle 162 to linearly move to and fro. The controller 161c is connected to the motor 161a for controlling the test vehicle 162 to linearly move to and fro. The image separator 15 is connected to the two image picking-up processors 12 and the double-cross lines generator 14 and is corresponding to the two image picking-up processors 12 for dividing the displaying picture into two pictures consisting of an upper picture and a lower picture.

Wherein, the image picking-up processor 12 includes a charge-coupled device, an extension tube and a lens.

Figure 3:
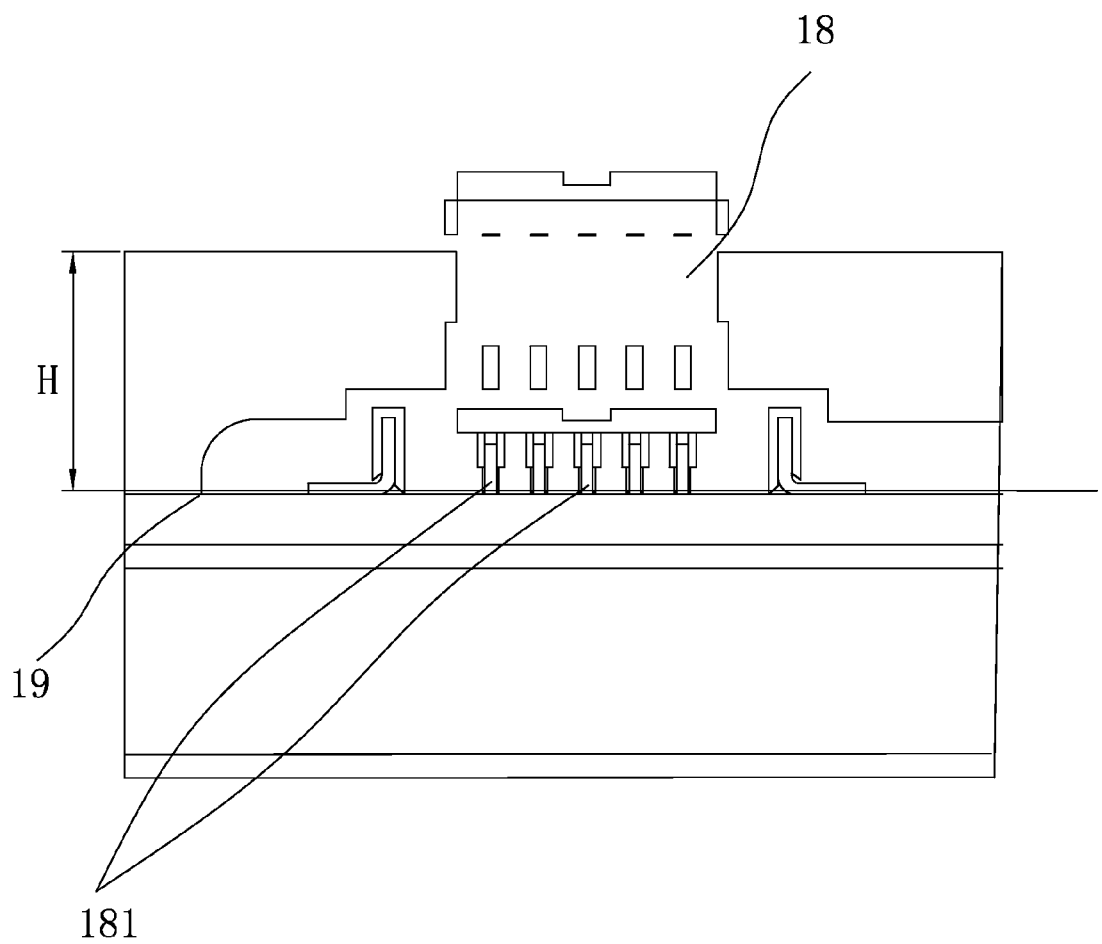
FIG. 3 is a schematic view of a testing image of a qualified product, which is displayed on a display when the coplanarity-testing machine of FIG. 2A tests products.

Referring to FIGS. 2A, 2B and 3, the following is the process of testing the test-waiting product 18 by the coplanarity-testing machine. Firstly, the regulating block 163 is mounted on the supporting surface 162a of the test vehicle 162 and located between the two image picking-up processors 12. Then the double-cross lines generator 14 is adjusted on the base of the two pictures displayed on the display 17 for making the horizontal lines generated by the generator 14 coincide with the projecting line of the bottom surface of the regulating block 163, and for making the vertical lines generated by the generator 14 measure the height H of the regulating block 163. The height H will be regarded as a qualified range of the coplanarity height of the test-waiting product 18, and the horizontal lines generated by the generator 14 will be used as a base line 19 for measuring the coplanarity height.

Referring to FIGS. 2A and 2B, the regulating block 163 is taken down, and several test-waiting products 18 are mounted onto the supporting surface 162a of the test vehicle 162 and located between the two image picking-up processors 12. The display 17 will directly display the relative location between the coplanarity height of the test-waiting product 18 and the height H of the regulating block 163. As shown in FIG. 3, the testing picture of a qualified product is displayed on the display 17. The test-waiting product 18 is non-qualified if the coplanarity height of the contacts 181 thereof are not within the range of the height H.

During the above testing process, the controller 161c is connected to the motor 161a for controlling the test vehicle 162 to linearly move to and fro whereby the test-waiting product 18 can be carried to linearly move to and fro on the working stage 10. Specifically, the test vehicle 162 is controlled by the way of operating the button 161c1 of the controller 161c. The button 161c1 is mounted on the bearing surface 101 of the working stage 10. After the first test-waiting product 18 is tested, the test vehicle 162 can carry the next test-waiting product 18 to the testing location by pressing the button 161c1. The test vehicle 162 can carry one new test-waiting product 18 to the testing location every time the button 161c1 is pressed. When the test vehicle 162 moving to the leftmost location, the button 161c1 is pressed again to make the test vehicle 162 return to the original location. After all the test-waiting products 18 on the test vehicle 162 are tested, the worker can replace the tested products 18 as new products waiting tested. After the same-style products being tested, the test vehicle 162 may be replaced as new test vehicle for carrying the different-style products.

As described above, the coplanarity-testing machine of the present invention can timely and exactly display the testing result of product on the display 17 by the image picking-up processor 12 cooperated with the illuminant 11. Because only the test vehicle 162 needs to be replaced, the coplanarity of the product can be fast tested and the coplanarity-testing machine is easy to be operated. The coplanarity-testing machine of the present invention has a high testing efficiency and a high exact degree of testing.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A coplanarity-testing machine at least comprising a working stage having a horizontal bearing surface, an illuminant, an image picking-up processor, a frequency converter, a double-cross lines generator, and a display, wherein the coplanarity-testing machine further comprising:

a linear module, including a test vehicle slidably mounted on the bearing surface of the working stage and having a horizontal supporting surface for carrying at least one test-waiting product; a linear drive mechanism mounted on the bearing surface of the working stage for driving the test vehicle to linearly move to and fro on the bearing surface; and a regulating block corresponding to the test-waiting product, having a horizontal top surface and a horizontal bottom surface, and being placed on the supporting surface of the test vehicle, wherein horizontal lines generated by the double-cross lines generator can coincide with a projecting line of the bottom surface of the regulating block by adjusting the double-cross lines generator, and vertical lines generated by the double-cross lines generator can measure the height of the regulating block, which can be displayed on the display, the test-waiting product illuminated by illuminant can be imaged on the display by the image picking-up processor and the frequency converter.

2. The coplanarity-testing machine as claimed in claim 1, further comprising two illuminants and two image picking-up processor separately corresponding to the two illuminants, wherein the test-waiting product or the regulating block is positioned between the two image picking-up processors.

3. The coplanarity-testing machine as claimed in claim 2, further comprising an image separator, which is connected to the two image picking-up processors and the double-cross lines generator and is corresponding to the two image picking-up processors for dividing a displaying picture into two pictures.

4. The coplanarity-testing machine as claimed in claim 1, wherein the linear drive mechanism comprises a motor, a threaded rod and a controller, the test vehicle has two screw holes formed thereon; the motor is connected to the threaded rod to drive it rotate; the screw thread of the threaded rod can mesh with a screw hole formed on a bottom surface of the test vehicle for driving the test vehicle to linearly move to and fro; the controller is connected to the motor for controlling the test vehicle to linearly move to and fro.

5. The coplanarity-testing machine as claimed in claim 1, wherein the illuminant is an LED source.

\* \* \* \* \*